US006529357B1

(12) United States Patent
Landinger et al.

(10) Patent No.: US 6,529,357 B1
(45) Date of Patent: Mar. 4, 2003

(54) COAXIAL OVERVOLTAGE PROTECTOR WITH IMPROVED INNER CONDUCTOR OF THE λ/4 SHORT-CIRCUIT LINE

(75) Inventors: Josef Landinger, Aschau (DE); Franz Pitschi, Rottach-Egern (DE)

(73) Assignee: Spinner GmbH Elektrotechnische Fabrik, München (DE)

( * ) Notice: Subject to any disclaimer, the term of this patent is extended or adjusted under 35 U.S.C. 154(b) by 280 days.

(21) Appl. No.: 09/630,378

(22) Filed: Aug. 1, 2000

(30) Foreign Application Priority Data

Aug. 5, 1999 (DE) ........................................ 199 36 869

(51) Int. Cl.[7] ................................................ H02H 3/20

(52) U.S. Cl. ....................................... 361/91.1; 361/119

(58) Field of Search ................................ 362/91.1, 119, 362/107

(56) References Cited

U.S. PATENT DOCUMENTS 3,849,750 A 11/1974 Baumbach et al.
6,266,224 B1 7/2001 Lang .......................... 361/119

*Primary Examiner*—Adolf Deneke Berhane
(74) *Attorney, Agent, or Firm*—Henry M. Feiereisen

(57) ABSTRACT

A coaxial overvoltage protector, includes a coaxial transmission line having an inner conductor and an outer conductor, and a λ/4 short-circuit line having an inner conductor radially branching off the inner conductor of the coaxial transmission line. The inner conductor of the λ/4 short-circuit line is electrically contacted with the outer conductor of the coaxial transmission line and guided in insulated manner through a wall of the outer conductor of the coaxial transmission line into a chamber of the outer conductor, thereby defining a portion which is received in the chamber and oriented at least approximately in a plane which is parallel to the axis of the coaxial transmission line.

6 Claims, 1 Drawing Sheet

COAXIAL OVERVOLTAGE PROTECTOR WITH IMPROVED INNER CONDUCTOR OF THE λ/4 SHORT-CIRCUIT LINE

CROSS-REFERENCES TO RELATED APPLICATIONS

This application claims the priority of German Patent Application, Serial No. 199 36 869.4, filed Aug. 5, 1999, the subject matter of which is incorporated herein by reference.

BACKGROUND OF THE INVENTION

The present invention relates, in general, to a coaxial overvoltage protector.

German Pat. No. DE 195 20 974 A1 describes an overvoltage protector having a coaxial transmission line with an inner conductor and an outer conductor, and a λ/4 short-circuit line with an inner conductor radially branching off the inner conductor of the coaxial transmission line. The inner conductor of the λ/4 short-circuit line is guided in insulated manner through a wall of the outer conductor of the coaxial transmission line and has a portion, which is received in a chamber of the outer conductor, and has one end electrically contacted with the outer conductor of the coaxial transmission line. The chamber in the outer conductor for accommodating the portion of the inner conductor of the λ/4 short-circuit line is configured as coaxial annular space, so that the portion of the inner conductor of the λ/4 short-circuit line extends in a radial plane of the coaxial transmission line. As a consequence of this configuration, the overvoltage protector has a comparably great diameter. The annular space can be made only by a complicated material removal process of an accordingly massive blank, requires a flanged ring to form one of both walls of the annular space which extend in a radial plane, and the provision of an outer ring for sealing off the annular space against the outside. Of course, suitable seals must also be provided between all these components.

SUMMARY OF THE INVENTION

It is thus an object of the present invention to provide an improved overvoltage protector, obviating the afore-stated drawbacks.

In particular, it is an object of the present invention to provide an improved overvoltage protector which is simple in structure and yet reliable in operation.

These objects, and others which will become apparent hereinafter, are attained in accordance with the present invention by providing a coaxial transmission line defining an axis and having an inner conductor and an outer conductor; and a λ/4 short-circuit line having an inner conductor radially branching off the inner conductor of the coaxial transmission line and electrically contacted with the outer conductor of the coaxial transmission line, with the inner conductor of the λ/4 short-circuit line being guided in insulated manner through a wall of the outer conductor of the coaxial transmission line into a chamber of the outer conductor so as to define a portion which is received in the chamber of the outer conductor, whereby the portion of the inner conductor of the λ/4 short-circuit line is oriented at least approximately in a plane which is parallel to the axis of the coaxial transmission line.

By so constructing an overvoltage protector in accordance with the present invention, the chamber can be configured, so to speak, as an attachment upon the outer conductor of the coaxial transmission line, having a flat bottom and a flat lid. As a consequence, the outer dimensions are reduced and significant savings with respect to manufacturing costs are realized. In addition, the size of the chamber can be more easily suited to the length of the inner conductor of the λ/4 short-circuit line. As is generally known in the art, the length of the inner conductor of the λ/4 short-circuit line is directly governed by the nominal frequency for which the overvoltage protector is dimensioned.

According to another feature of the present invention, the portion of the inner conductor of the λ/4 short-circuit line may have a substantially ring-shaped configuration around an axis which is substantially perpendicular to the axis of the coaxial transmission line, This configuration is especially space-saving and suitable for nominal frequencies of few 100 MHz.

According to another feature of the present invention, the outer conductor of the coaxial transmission line can be configured with a channel in the chamber, with the portion of the inner conductor of the short-circuit line extending in the channel. In this manner, a compact structure or relatively low nominal frequencies, i.e. situations when the inner conductor of the λ/4 short-circuit line is relatively long, can be implemented. The channel may be configured in the form of a spiral or a coil winding so as to exhibit a length which exceeds the perimeter of the chamber. The walls of the channel may be metal, in particular when the portion of the short-circuit line is configured as band-shaped line. Of course, the outwardly directed portion of the short-circuit line may be made of any other suitable line construction, e.g. as strip line or as microstrip.

According to still another feature of the present invention, the outer conductor is formed by a metal body which forms the chamber for accommodating the portion of the inner conductor of the λ/4 short-circuit line.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
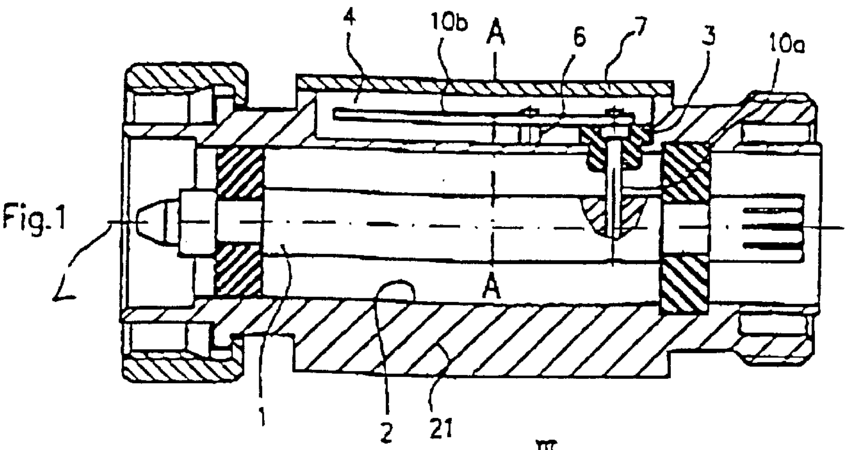
FIG. 1 is a longitudinal section of one embodiment of an overvoltage protector according to the present invention.

Throughout all the Figures, same or corresponding elements are generally indicated by same reference numerals.

Turning now to the drawing, and in particular to FIG. 1, there is shown a longitudinal section of one embodiment of an overvoltage protector according to the present invention in the form of a coaxial transmission line between two plug-in connections. Of course, this configuration is shown by way of example only, and other configurations which generally follow the concepts outlined here are considered to be covered by this disclosure. The coaxial transmission line defines an axis L and includes an inner conductor 1, and a metal body 21, which forms an outer conductor 2. Connected to the inner conductor 1 is a λ/4 short-circuit line which has a first inner conductor portion 10*a*, branching off the inner conductor 1 in a radial direction and guided through a wall of the outer conductor 2 for connection to a second inner conductor portion 10*b*. The first inner conductor portion 10*a* is connected to the inner conductor 1 in the form of a socket/plug assembly and extends radially with respect to the inner conductor 1. The outer conductor 2 has an opening for securement of an insert 3, which is made of an insulating material and formed with a bore for passage of the inner conductor portion 10*a*. The insert 3 forms, at the same time, a spacer for the attached second inner conductor portion 10*b* which is received in the form of a strip line inside a chamber 4 provided in the metal body 21. The second inner conductor portion 10*b*, located inside the chamber 4, may be configured in a different manner, e.g. in microstrip or in coaxial technique.

Figure 3:
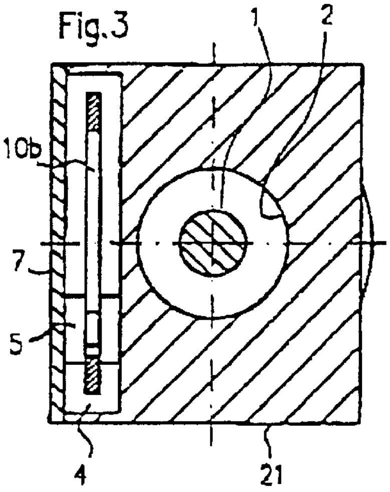
FIG. 3 is a sectional view of the overvoltage protector, taken along the line III—III in FIG. 2.
Figure 2:
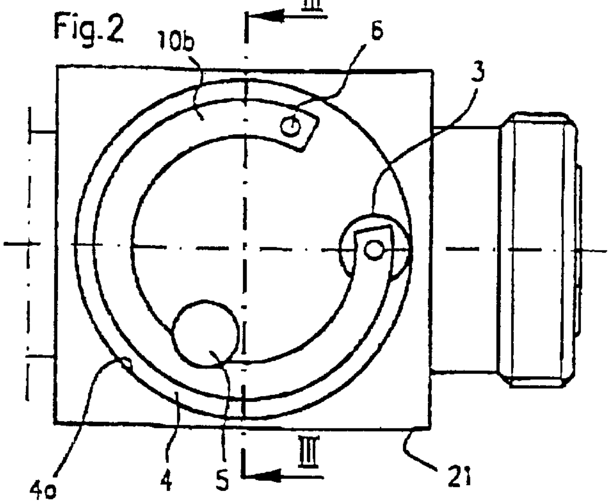
FIG. 2 is a plan view of the overvoltage protector.

As shown in FIG. 2, the chamber 4 is bounded by a side wall 4*a* of cylindrical shape. Extending parallel to the side wall 4*a* is the second band-shaped inner conductor portion 10*b* which is held in place by a support 5 of insulating material, as also depicted in FIG. 3, and terminates in a contact block 6 for establishing an electric connection with the metal body 21. The chamber 4 is sealed to the outside in a HF-tight manner by a metallic lid 7. In FIG. 2, the lid 7 has been removed to show internal components of the overvoltage protector. The lid 7 may be a separate component or may form part of the metal body 21 so that the chamber 4 is provided in its entirety in the outer conductor 2 of the coaxial transmission line. The second inner conductor portion 10*b* of the λ/4 short-circuit line extends in a plane which is parallel to the axis L of the coaxial transmission line and is arranged in the shape of a ring about an axis A—A (FIG. 1) which is perpendicular to the axis L.

Figure 5:
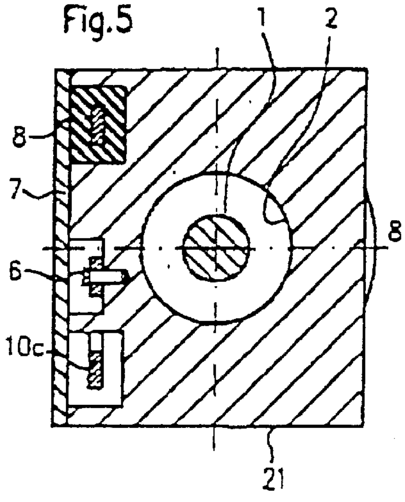
FIG. 5 is a sectional view of the overvoltage protector of FIG. 4, taken along the line V—V in FIG. 4.
Figure 4:
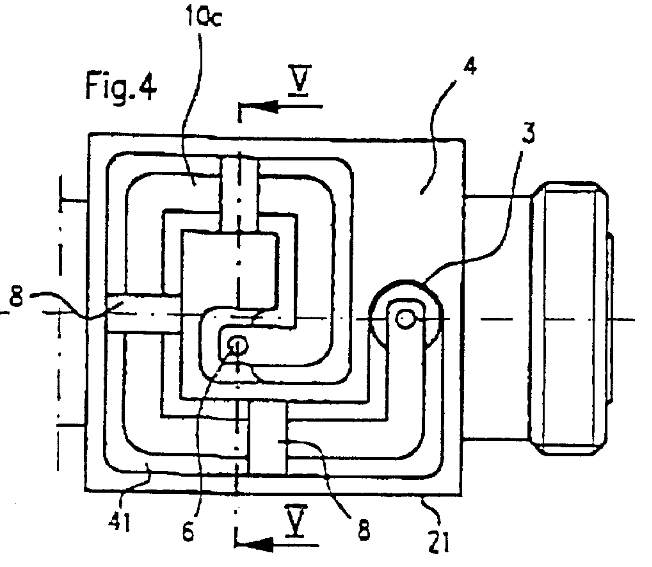
FIG. 4 is a top view of another embodiment of an overvoltage protector according to the present invention.

Turning now to FIGS. 4 and 5, there are shown a plan view and a sectional view of another embodiment of an overvoltage protector according to the present invention. Parts corresponding with those in FIGS. 1 to 3 are denoted by identical reference numerals and not explained again. In this embodiment, provision is made in the chamber 4 for a channel 41 which extends from the insert 3 to the contact block 6 in a substantially spiral-shaped configuration and is bounded by side walls which are electrically contacted by the metallic lid 7. As a result of the substantially spiral-shaped configuration, the channel 41 has a length which exceeds the perimeter of the chamber 4. In the embodiment of the overvoltage protector of FIGS. 4 and 5, the λ/4 short-circuit line has a second inner conductor portion 10*c* which is disposed in the channel 41 in analogous substantial spiral-shaped manner and has one end fitted in the insert 3 and another end secured to the contact block 6. The inner conductor portion 10*c* is designed in the form of a band line and is held in place by a suitable number of supports 8 of insulating material.

While the invention has been illustrated and described as embodied in a coaxial overvoltage protector, it is not intended to be limited to the details shown since various modifications and structural changes may be made without departing in any way from the spirit of the present invention.

What is claimed as new and desired to be protected by Letters Patent is set forth in the appended claims:

1. A coaxial overvoltage protector, comprising:

a coaxial transmission line defining an axis and having an inner conductor and an outer conductor; and a λ/4 short-circuit line having an inner conductor radially branching off the inner conductor of the coaxial transmission line and having one end electrically contacted with the outer conductor of the coaxial transmission line, said inner conductor of the λ/4 short-circuit line guided in insulated manner through a wall of the outer conductor of the coaxial transmission line into a chamber of the outer conductor so as to define a portion which is received in the chamber of the outer conductor, wherein the portion of the inner conductor of the λ/4 short-circuit line, received in the chamber, is oriented at least approximately in a plane which is parallel to the axis of the coaxial transmission line.

2. The overvoltage protector of claim 1 wherein the portion of the inner conductor of the λ/4 short-circuit line has a substantially ring-shaped configuration around an axis which is substantially perpendicular to the axis of the coaxial transmission line.

3. The overvoltage protector of claim 1 wherein the chamber has formed therein a channel, said portion of the inner conductor of the λ/4 short-circuit line extending in the channel.

4. The overvoltage protector of claim 1 wherein the outer conductor is formed by a metal body which forms the chamber for accommodating the portion of the inner conductor of the λ/4 short-circuit line.

5. The overvoltage protector of claim 3 wherein the channel has a substantially spiral-shaped configuration, said portion of the inner conductor of the λ/4 short-circuit line received in the channel and substantially following the configuration of the channel.

6. The overvoltage protector of claim 5 wherein the channel has a length which exceeds a perimeter of the chamber.

* * * * *